United States Patent [19]

Okajima

[11] 4,348,977
[45] Sep. 14, 1982

[54] WATER CONVEYANCE

[76] Inventor: Tadishi Okajima, 1-12-6 Taishibashi, Asahi-ku, Osaka, Japan

[21] Appl. No.: 34,343

[22] Filed: Apr. 30, 1979

[30] Foreign Application Priority Data

Mar. 3, 1979 [JP] Japan .................................. 54-024960

[51] Int. Cl.³ ................................................ B63B 1/00
[52] U.S. Cl. ..................................... 114/273; 114/61; 114/280; 440/54; 440/63
[58] Field of Search .................... 114/61, 56, 271, 272, 114/273, 274, 275, 276, 277, 280, 281, 282, 285; 115/41 R; 248/640–643; 440/54, 63

[56] References Cited

U.S. PATENT DOCUMENTS

| | | | |
|---|---|---|---|
| 1,823,735 | 9/1931 | Glasby | 114/272 |
| 2,821,948 | 2/1958 | Harkson | 114/272 |
| 3,199,483 | 10/1965 | Ellzey | 114/281 |
| 3,522,785 | 8/1970 | Thompson | 114/273 |
| 3,918,382 | 11/1975 | Austin | 114/273 |
| 3,952,678 | 4/1976 | Weston | 114/272 |

*Primary Examiner*—Trygve M. Blix
*Assistant Examiner*—D. W. Keen

[57] ABSTRACT

A water conveyance having two hull members spaced from each other and carrying a hydrofoil toward the stern thereof and an airfoil or wing toward the bow. The hydrofoil and airfoil cooperate to lift the hull members from the water to reduce water resistance and increase travel speed. The hydrofoil is movable vertically to accommodate the raising and lowering of the hull members during start up and slow down. Flaps on the wing control the attitude of the conveyance and, in a preferred embodiment, the flaps are controlled automatically to maintain a generally horizontal attitude.

12 Claims, 9 Drawing Figures

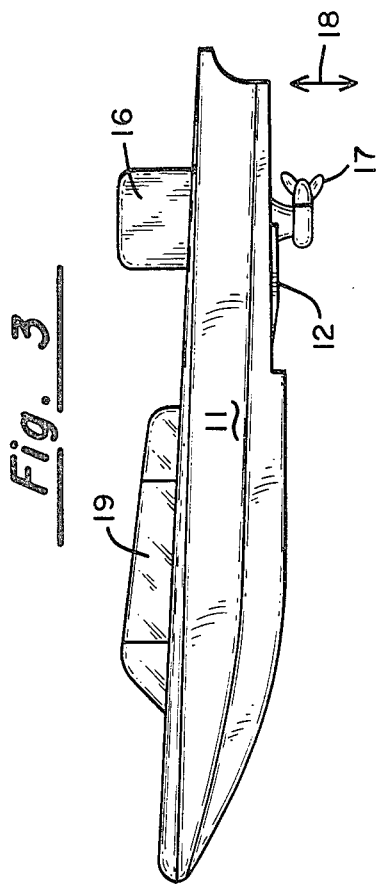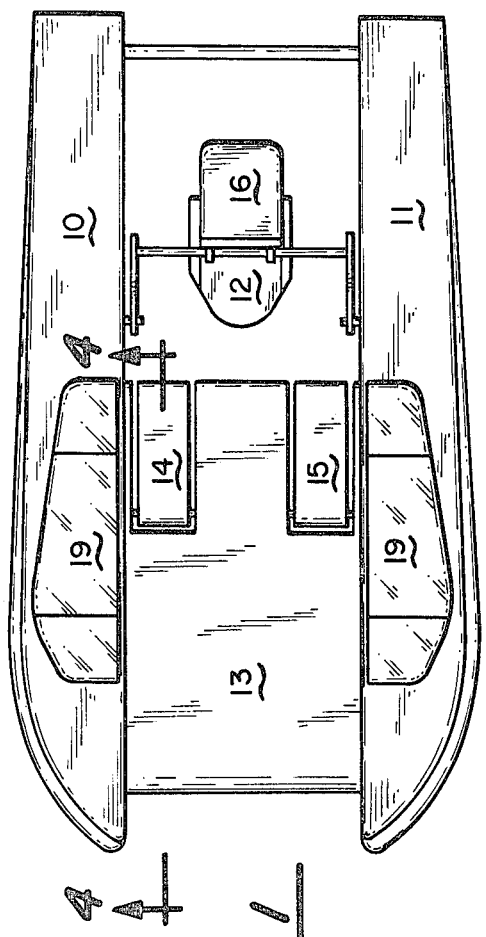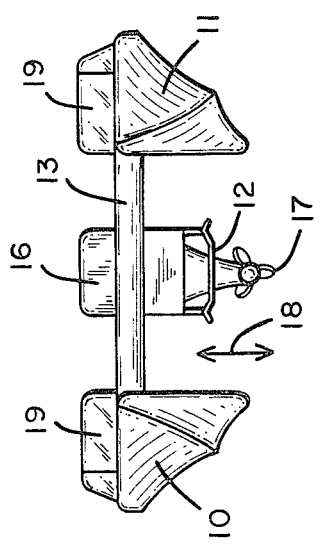

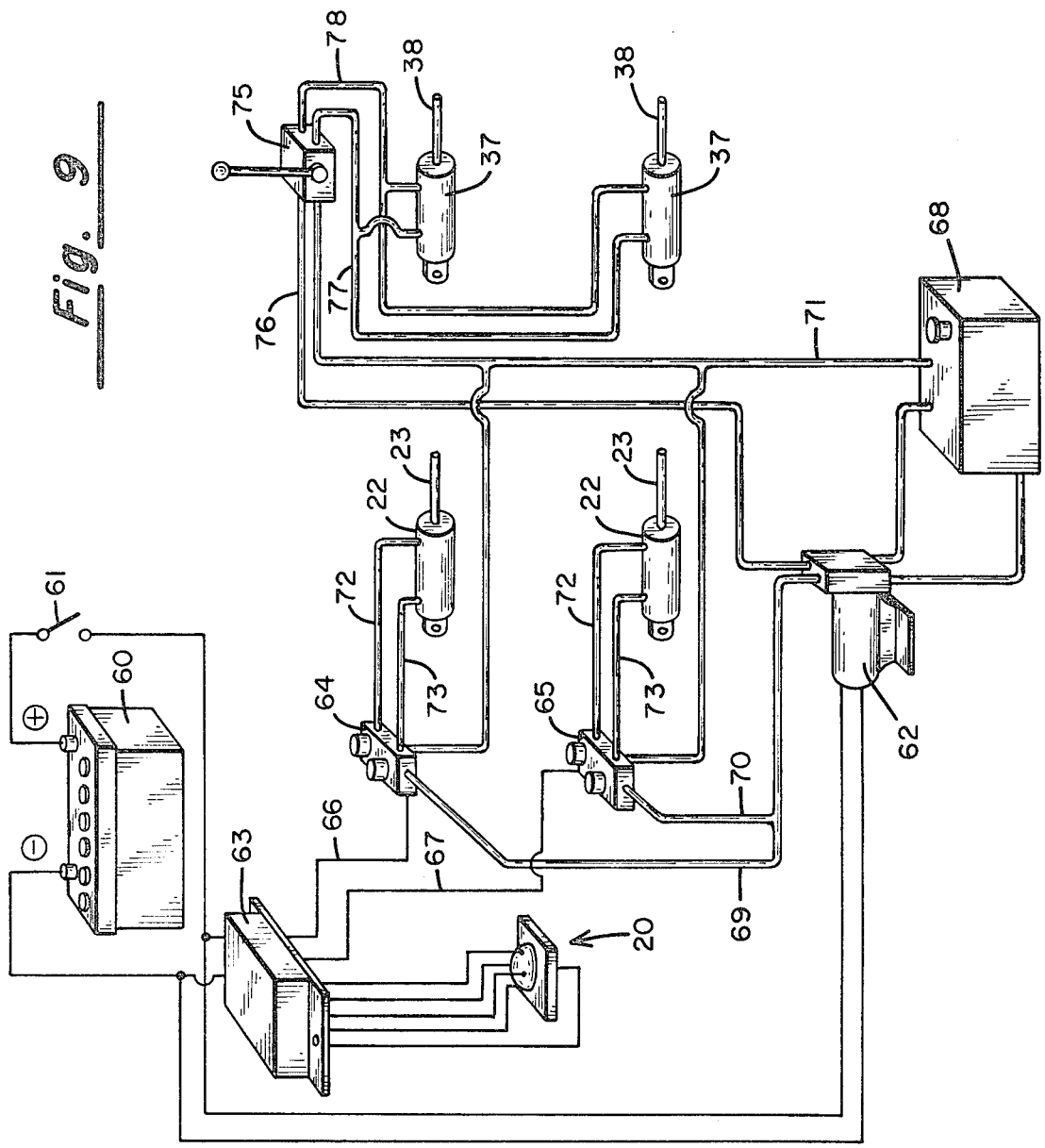

4,348,977

WATER CONVEYANCE

DESCRIPTION

BACKGROUND OF THE INVENTION

Water conveyances have taken inumerable forms throughout history from hollowed out logs to modern sophisticated mechanisms.

One shortcoming of many water conveyance designs resides in the hull. While considerable effect has been expended on hull design, it still requires significant amounts of power to drive the hull through the water. This reduces the efficiency of the driving mechanism as well as the speed that can be attained by the conveyance. For this reason, recent years have seen the evolution of conveyances which ride over the water to reduce resistance. The hydrofoil is one device for this purpose.

SUMMARY OF THE PRESENT INVENTION

The present invention provides a water conveyance which rides over the water thereby reducing water resistance and increasing efficiency of the driving mechanism. Two hull members are provided for flotation on the water during operation at low speed and at rest. A hydrofoil is positioned intermediate the hull members toward their stern and is movable vertically relative to the hull members during operation. An airfoil or wing is positioned toward the bow of the hull members and is provided with flaps for attitude control. An attitude sensing system senses the attitude of the conveyance and automatically manipulates the flaps to maintain the conveyance in a generally horizontal attitude. In a preferred embodiment, the conveyance is driven by an outboard motor that is movable with the hydrofoil. The hull members may each consist of one half of a hull of conventional design.

BRIEF DESCRIPTION OF THE DRAWINGS

FIG. 1 illustrates a top view of the preferred embodiment of the present invention.

FIG. 2 illustrates a rear view of the preferred embodiment of FIG. 1.

FIG. 3 illustrates a side view of the preferred embodiment of FIG. 1.

FIG. 9 illustrates a control system forming a part of the present invention.

DETAILED DESCRIPTION OF THE DRAWINGS

Figure 4:
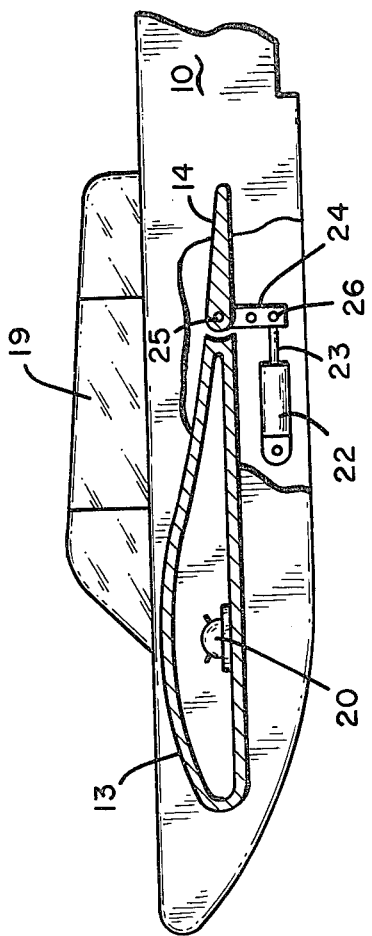
FIG. 4 illustrates a cross section and partial cutaway taken along the line 4—4 in FIG. 1.

Referring now to FIG. 1, there is illustrated a top view of a preferred embodiment of the present invention. The conveyance is formed of first and second hull members 10 and 11 which are spaced from each other. Essentially, each of the members 10 and 11 may consist of one half of a pleasure boat hull of conventional design. A hydrofoil 12 is supported intermediate the members 10 and 11 and is movable by linkages (to be described more fully below) vertically with respect to the hull members 10 and 11. That is, the hydrofoil 12 is movable in a direction generally perpendicular to the plane of the paper containing FIG. 1. Hydrofoil 12 is carried toward the stern of the hull members 10 and 11 while an aeronautical lift member or airfoil 13 is carried toward the bow. The airfoil 13 is essentially a section of an airplane wing having a cross section of any convenient design in accordance with aeronautical principles. For attitude control, the airfoil 13 is provided with flaps 14 and 15 which will be described more fully below. The conveyance is powered by an outboard motor 16 which is movable with the hydrofoil 12.

Referring now to FIGS. 2 and 3, there is shown, respectively, a front and side view of the embodiment illustrated in FIG. 1. In FIGS. 2 and 3, and throughout the figures, like reference numerals designate like elements. As shown in FIGS. 2 and 3, outboard motor 16 is provided with a water propeller 17 positioned under the hydrofoil 12 and which is movable with the hydrofoil 12 along the direction of the arrow 18. Compartments 19 are carried by the hulls 10 and 11 provide room for passengers.

Referring now to FIG. 4, there is shown a cross section taken along the line 4—4 in FIG. 1 and a partial cutaway of hull 10. Airfoil 13 has an aerodynamic configuration and is designed to provide a lift to the bow portions of the hull members 10 and 11. The design of such members is known to the art and need not be set out herein in detail. A switch 20 is carried within air foil 13, the operation of switch 20 being described more fully below. For the present discussion, the switch 20 senses the attitude of the conveyance and it results in movement of the flaps 14 and 15 to maintain that attitude generally horizontal. The use of flaps on an airfoil to control attitude is known to the prior art and needs no further discussion. Positioned within the hull member 10 is a power cylinder 22. The cylinder 22 is activated under the control of the switch 20 causing its rod 23 to move forwardly or rearwardly, in known fashion. The cylinder 22 may be pneumatically, hydraulically or otherwise activated, in known manner.

Figure 6:
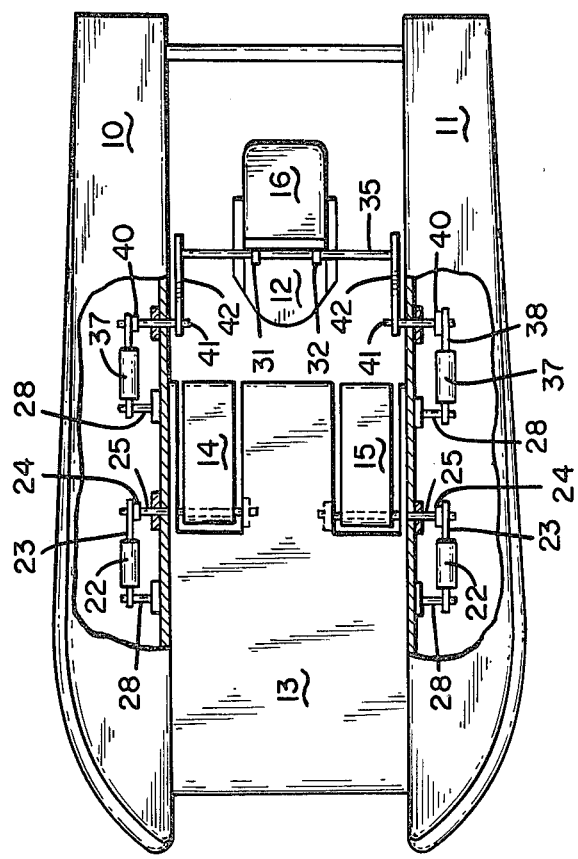
FIG. 6 is a partial cutaway of the preferred embodiment of FIG. 1.

A crank formed of a lever 24 and rod 25 has its lever 24 connected to the rod 23 of cylinder 22 at 26. The connection at 26 is a pivot connection allowing the lever 24 to move with rod 23, that movement causing the rotation of the rod 25. The rod 25 is secured to flap 14 such that rotation of the rod 25 causes a corresponding movement in the flap 14. Thus, control of the cylinder 22, under the control of the switch 20, causes the flap 14 to pivot up or down for attitude control. An identical arrangement of cylinder and crank is provided for flap 15 within hull member 11 as illustrated in FIG. 6. In FIG. 6, the pistons 22 are anchored to their respective hull sidewall by a member 28 which is secured to the inner sidewall of the hull and extends into engagement with the cylinders 22. Any other mode of anchoring cylinders 22 may be employed within the scope of the present invention.

Figure 5:
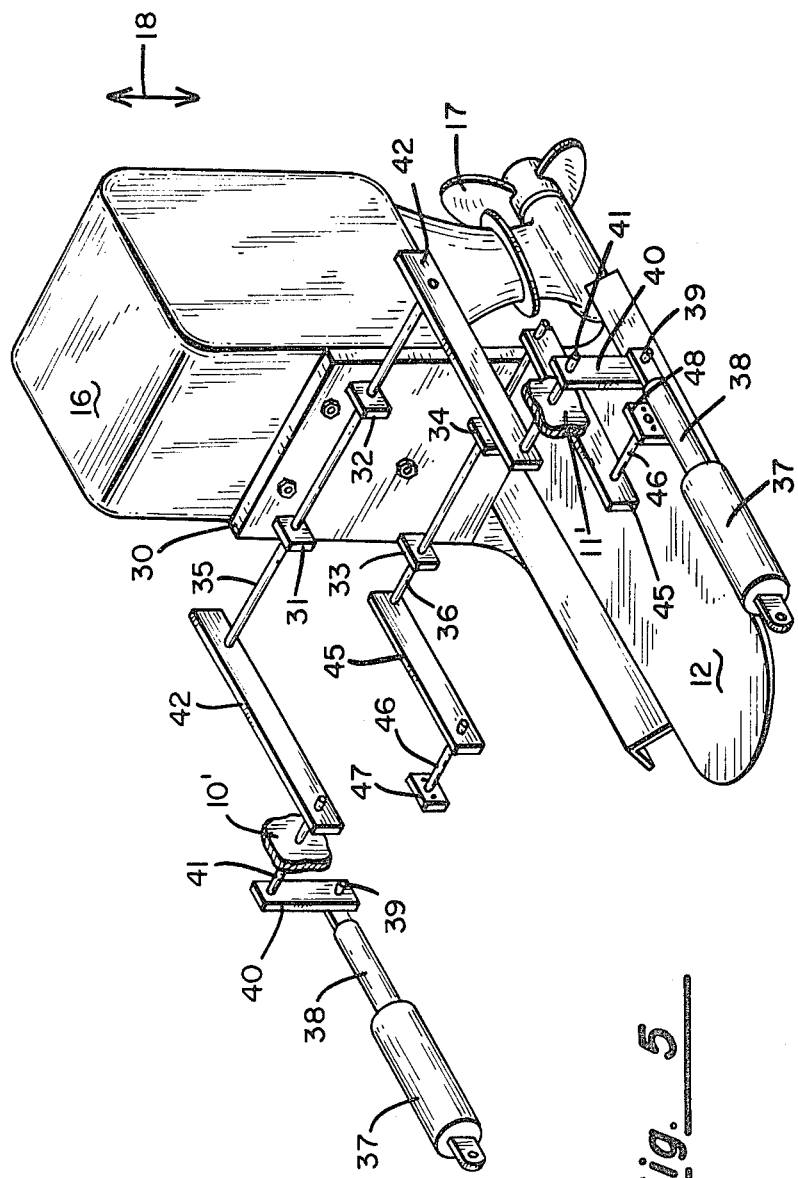
FIG. 5 illustrates a preferred embodiment of a hydrofoil raising and lowering mechanism forming a part of the present invention.

Referring now to FIG. 5, there is illustrated the hydrofoil 12 and outboard motor 16, and the manner by which they are raised and lowered. A plate 30 carries the hydrofoil 12 on the lower portion thereof and has the motor 16 secured thereto in any convenient manner. Four projections 31–34 extend from the plate 30 on the opposite side of the motor and are secured to the plate in any desired manner, as by welding. The projections 31–34 have apertures therethrough which accept one of the rods 35 or 36. The rods 35 and 36 may rotate in the apertures of projections 31–34. Cylinders 37 (which may be similar to the cylinders 22) are carried within hull members 10 and 11, one of cylinders 37 being in each hull member (see FIG. 6). Rods 38 of cylinders 37 are pivotally connected at 39 to a lever arm 40 of a crank formed of the lever arm 40, a rod 41 and a lever arm 42. The rod 35 extends to engage levers 42. Elements 10′ and 11′ represent the side wall of the hull member of like reference numeral through which the rods 41 pass.

Rod 36 has its ends in engagement with links 45 while rods 46 extend between the links 45 and a hull member side wall. A block 47 is adapted to be secured to the side wall of hull member 10 and is in engagement with one of the rods 46 to secure its end to the hull side wall. Similarly, the end of the other rod 46 is secured to the side wall of hull member 11 via block 48. The manner of engagement between the blocks 47 and 48, their associated hull member side wall and the rods 46 may take any known form suitable for anchoring the rods 46 in position.

On activation of the cylinders 37, their rods 38 will move causing the crank levers 40 to pivot about the rods 41. This movement of the crank levers 40 causes rods 41 to rotate resulting in the rotation of the crank levers 42. Rotation of the crank levers 42 causes a movement of the plate 30 in the direction of the arrow 18 thus raising or lowering the hydrofoil 12 and motor 16. The linkages associated with the projections 33 and 34 provide stability. This arrangement is further illustrated in FIG. 6 which is a partial cutaway of a top view of a preferred embodiment of the present invention. As illustrated in FIG. 6, the cylinders 37 may be secured to their respective hull member 10 or 11 in any known manner, as by post 28 in a manner similar to cylinders 22.

Figure 7:
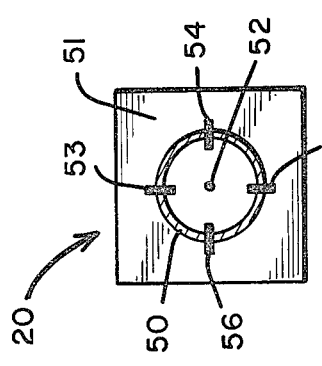
FIG. 7 is a top view of a portion of the control system forming a part of the present invention.
Figure 8:
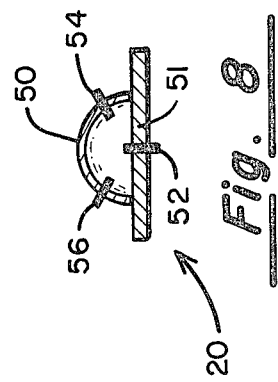
FIG. 8 is a side view of the element illustrated in FIG. 7.

Referring now to FIGS. 7 and 8, there is illustrated a top and side view of the switch 20 discussed above with reference to FIG. 4. The switch 20 is formed of a hemispherical glass ball 50 mounted on a platform 51. The ball is provided with a central contact 52 and peripheral contacts 53–56. Mercury is positioned within the space 57 defined by the hemispherical glass such that it will not make contact with the contacts 53–56 when the platform 51 is maintained in a generally horizontal condition or attitude. However, if the platform should assume an attitude other than horizontal, the mercury will establish electrical communication between one or more of the terminals 53–56 and the central terminal 52 thereby allowing the attitude of the conveyance to be sensed and automatically brought back to the horiztonal as will be described more fully below. For example, if the platform were positioned within the air foil 13 such that the terminal 56 were facing the bow of the boat, the terminal 54, the stern of the boat, and the terminals 55 and 53 to the left and right, respectively, as one faces the bow of the boat, if the bow were high electrical communication would be between the terminals 54 and 52 while if the bow were low (the stern high) the electrical communication would be between the terminals 56 and 52. Similarly, if the hull member 11 were lower than the hull member 10, the electrical communication would be between the terminals 55 and 52 while a lower hull member 10 would result in electrical communication between the terminals 53 and 52. Combinations of these attitudes would result in electrical communication between more than one of the terminals 53–56 with terminal 52.

Referring now to FIG. 9, there is illustrated a control system for the cylinder 22 and 37 employing the switch 20. A battery 60 serves as a source of electric potential and is connected to a switch 61 to an oil pump 62 and logic circuitry 63. Logic circuitry 63 is connected to each of the terminals 52–56 of switch 20 and provides an output signal in accordance with which of the terminals 53–56 are in electrical communication with the terminal. Those control signals are applied to control valves 64 and 65 via lines 66 and 67, respectively, it being understood that more than one signal is applied to each of the valves 64 and 65 and that the lines 66 and 67 are representative of the signal path or paths. The pump 62 draws fluid from a reservoir 68, and directs that fluid, under pressure, to the valves 64 and 65 via lines 69 and 70, respectively. A return line 71 is connected to each of the valves 64 and 65 to provide a return path for the fluid to reservoir 68. Under the control of the signals appearing on lines 66 and 67, the valves 64 and 65 selectively apply the pressurized fluid appearing at their inlet line 69 and 70 to one of two output lines 72 and 73, line 72 controlling the retraction of the rod 23 of cylinder 22 with line 73 controlling the extension of rod 23.

Pump 62 is connected to a manual valve 75 via a line 76, line 71 also providing a return path to the reservoir 68 for valve 75. Valve 75 has two outputs, 77 and 78, each connected the cylinders 27, the line 77 controlling the extension of the rod 38 from cylinder 37 with line 78 controlling the retraction of rod 38, in known manner.

In operation, and with the switch 20 positioned relative to the conveyance as discussed above, the motor 16 is activated and the conveyance accelerated. During acceleration, the bow of the boat will be up relative to the stern causing the mercury to contact the terminal 54. This results in a signal to both the valves 64 and 65 to extend their rod 23 causing the flaps 14 and 15 to pivot in a clockwise direction, the pivoting of the flap in this direction having a tendency to lower the bow of the boat. However, the airfoil and flaps are not effective during the initial stages of acceleration. As the conveyance accelerates further, the valve 75 is operated to cause the rods 38 of cylinders 37 to retract lowering the hydrofoil and the motor causing the stern of the boat to rise. This change in attitude is sensed by the switch 20 causing the flaps to lower. In the event that the conveyance lists to either side, forward or rearward, the switch 20 will activate one or both of the valves 64 and 65 causing the flaps 14 and 15 to move, the relationship of the flaps to the air foil causing an attitude adjustment, in known manner. At sufficient speed, the airfoil maintains the bow portion of the hull members above the water while the hydrofoil supports the rear or stern portion of the hull members out of the water, thereby significantly reducing the water resistance of the conveyance and allowing operation at greater speed with more efficiency.

Many modifications and variations of the present invention are possible in light of the above teachings. It is therefore to be understood that, within the scope of the appended claims, the invention may be practiced other than as specifically described.

I claim:

1. A water conveyance which comprises:
   first and second hull means spaced from each other;

airfoil means extending between said hull means toward the bow thereof, said airfoil means having pivotable flaps extending toward the stern thereof;

a pivotable lever attached to each of said hull means and an interconnecting support extending therebetween;

means for propelling said conveyance over the water, attached to said interconnecting support;

hydrofoil means attached to said interconnecting support; means for pivoting both of said pivotable levers in unison, whereby said hydrofoil means and said means for propelling may be simultaneously raised and lowered; and means for adjusting said airfoil pivotable flaps.

2. The water conveyance of claim 1 wherein said airfoil means comprises means for correcting a list of said water conveyance.

3. The water conveyance of claim 1 further comprising means for maintaining said conveyance in a generally horizontal attitude.

4. The water conveyance of claim 3 wherein said horizontal attitude maintaining means comprises attitude sensing means and means responsive to said attitude sensing means for controlling said pivotable flaps.

5. A double hull water conveyance comprising a fixed airfoil connected between said hulls and attaching said hulls in spaced apart relationship, said airfoil having trailing and pivotable flap means for adjusting the attitude of said water conveyance;

a crank and arm assembly pivotally connected to both of said hulls and extending therebetween, whereby pivoting of said crank causes raising and lowering of said arm relative to said hulls; means for propelling said water conveyance over water, attached to said crank and arm assembly;

hydrofoil means attached to said crank and arm assembly;

first control means for pivoting said pivotable flaps; and second control means for pivoting said crank and arm assembly.

6. The water conveyance of claim 5, further comprising attitude sensing means for detecting changes in the attitude of said water conveyance, and signal generating means for generating signals in response thereto.

7. The water conveyance of claim 6, further comprising means for receiving said signals and for generating attitude-correcting drive signals to said first control means.

8. The water conveyance of claim 5, further comprising means for manually actuating said second control means.

9. The water conveyance of claim 8, wherein said means for manually actuating further comprises at least one hydraulic cylinder and piston and a control valve for directionally activating said piston.

10. The water conveyance of claim 8, wherein said control means further comprises a lever arm connected to said piston and to said crank and arm assembly.

11. The water conveyance of claim 10, wherein said crank and arm assembly further comprises a pair of cranks, each respectively pivotally attached to a hull, and an arm attached therebetween.

12. The water conveyance of claim 11, further comprising a bracket attached between said arm and said means for propelling and said hydrofoil means; and further comprising a second crank and arm assembly pivotally connected to both of said hulls and extending therebetween, and attached to said bracket.

* * * * *